United States Patent
Alexander et al.

(10) Patent No.: US 9,703,614 B2
(45) Date of Patent: *Jul. 11, 2017

(54) MANAGING A FREE LIST OF RESOURCES TO DECREASE CONTROL COMPLEXITY AND REDUCE POWER CONSUMPTION

(71) Applicant: INTERNATIONAL BUSINESS MACHINES CORPORATION, Armonk, NY (US)

(72) Inventors: Gregory W. Alexander, Pflugerville, TX (US); Brian D. Barrick, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,866

(22) Filed: Oct. 4, 2016

(65) Prior Publication Data

US 2017/0068576 A1    Mar. 9, 2017

Related U.S. Application Data

(63) Continuation of application No. 15/073,776, filed on Mar. 18, 2016, which is a continuation of application No. 14/845,338, filed on Sep. 4, 2015.

(51) Int. Cl.
*G06F 9/50* (2006.01)
*G06F 9/48* (2006.01)

(52) U.S. Cl.
CPC .......... *G06F 9/5094* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 7,051,329 B1 * | 5/2006 | Boggs ................. | G06F 9/30123 712/E9.027 |
| 7,191,315 B2 * | 3/2007 | Gold .................... | G06F 9/30098 712/217 |
| 2003/0088611 A1 * | 5/2003 | Gajjar ................. | G06F 11/1008 709/202 |
| 2013/0061009 A1 * | 3/2013 | Kumar .................. | G06F 12/023 711/154 |
| 2014/0013085 A1 | 1/2014 | Vats et al. | |

* cited by examiner

*Primary Examiner* — Umut Onat
(74) *Attorney, Agent, or Firm* — Cantor Colburn LLP

(57) ABSTRACT

Embodiments include method, systems and computer program products for searching a social network for media content. Aspects include identifying one or more available resources for execution by the processor, determining a maximum number of resources the processor can utilize in executing an instruction group, and grouping the one or more available resources into one or more resource groups, wherein each of the one or more resource groups has a size equal to the maximum number. Aspects also include receiving a request from a decode logic for a number of resources for execution and dispatching one of the one or more resource groups in response to the request by providing the number of resources for execution to the processor and sending remaining resources in the one of the one or more resource groups to a recycle queue.

1 Claim, 6 Drawing Sheets

MANAGING A FREE LIST OF RESOURCES TO DECREASE CONTROL COMPLEXITY AND REDUCE POWER CONSUMPTION

DOMESTIC PRIORITY

This application is a continuation of the legally related U.S. application Ser. No. 15/073,776 filed Mar. 18, 2016 which is a continuation of legally related application Ser. No. 14/845,338 filed Sep. 4, 2015, both of which are fully incorporated herein by reference.

BACKGROUND

The present disclosure relates to processors and more specifically, to methods, systems and computer program products for managing a free list of available resources in a processor to decrease control complexity and reduce power consumption.

Modern processors generally support simultaneous multi-threading to increase throughput. Processor throughput may be measured by the useful execution of a number of instructions per thread for each stage of a pipeline of the processor. Various techniques are used to take advantage of instruction level parallelism and to increase the throughput of the processor. However, many of these techniques add more hardware and more depth to the pipelines of the processor. In addition, control complexities and data dependencies associated with many such techniques may reduce a maximum throughput of the processor.

Speculative execution of instructions can be used to perform parallel execution of instructions despite dependencies in the source code. However, the execution techniques used to perform speculative execution may utilize a relatively large number of physical registers, which are used to store the state of intermediate results from instruction execution. Typically, a free list is used to keep track of which physical registers are not currently in use. These free physical registers are available for use by incoming instructions. As the number of physical registers increase, the number of storage elements used for the free list and for identifying recently retired physical register identifiers increases. As a result, the power required for the maintenance of these physical registers increases.

Current techniques for managing a free list for multi-threaded processors include creating a buffer of available physical registers for each pipeline and committing each available physical registers to one of the pipelines. The buffers are then independently managed and physical registers are dispatched from the buffer for each pipeline to each thread as needed.

SUMMARY

In accordance with an embodiment, a method for managing a free list of available resources in a processor is provided. The method includes identifying one or more available resources for execution by the processor, determining a maximum number of resources the processor can utilize in executing an instruction group, and grouping the one or more available resources into one or more resource groups, wherein each of the one or more resource groups has a size equal to the maximum number. The method also includes receiving a request from a decode logic for a number of resources for execution, dispatching one of the one or more resource groups in response to the request by providing the number of resources for execution to the processor and sending remaining resources in the one of the one or more resource groups to a recycle queue.

In accordance with another embodiment, a system for managing a free list of available resources in a processor includes a processor in communication with one or more types of memory. The processor is configured to identify one or more available resources for execution by the processor, determine a maximum number of resources the processor can utilize in executing an instruction group, and group the one or more available resources into one or more resource groups, wherein each of the one or more resource groups has a size equal to the maximum number. The processor is also configured to receive a request from a decode logic for a number of resources for execution, dispatch one of the one or more resource groups in response to the request by providing the number of resources for execution to the processor and send remaining resources in the one of the one or more resource groups to a recycle queue.

In accordance with a further embodiment, a computer program product for managing a free list of available resources in a processor includes a non-transitory storage medium readable by a processing circuit and storing instructions for execution by the processing circuit for performing a method. The method includes identifying one or more available resources for execution by the processor, determining a maximum number of resources the processor can utilize in executing an instruction group, and grouping the one or more available resources into one or more resource groups, wherein each of the one or more resource groups has a size equal to the maximum number. The method also includes receiving a request from a decode logic for a number of resources for execution, dispatching one of the one or more resource groups in response to the request by providing the number of resources for execution to the processor and sending remaining resources in the one of the one or more resource groups to a recycle queue.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for managing a free list of available resources in a processor to decrease control complexity and reduce power consumption are provided. In exemplary embodiments, managing a free list for multi-threaded processors includes creating a buffer of available resources, such as physical registers, for each pipeline and committing available physical registers to one of the pipelines. The buffers are then managed as groups of resources, such that each group includes a slot for a resource for each of the pipelines. An entire group of resources is dispatched from the buffer when one or more resources of the group are requested. The requested resources are dispatched to the processor for execution and the remaining resources in the group are set to a recycle queue. In exemplary embodiments, the power reduction is achieved by obtaining available resources from a much smaller recycle queue rather than power-up the larger free list logic.

Figure 1:
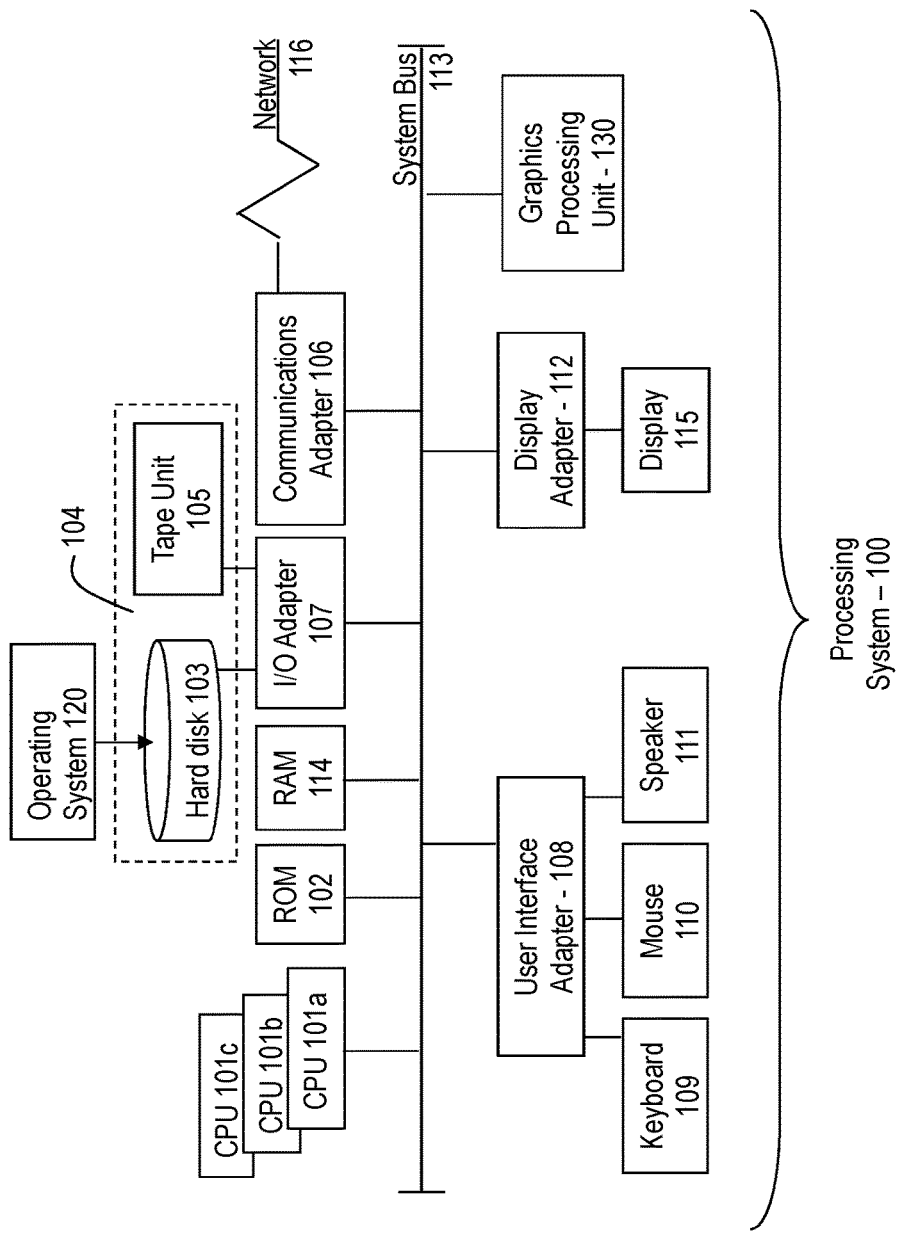
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) processor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
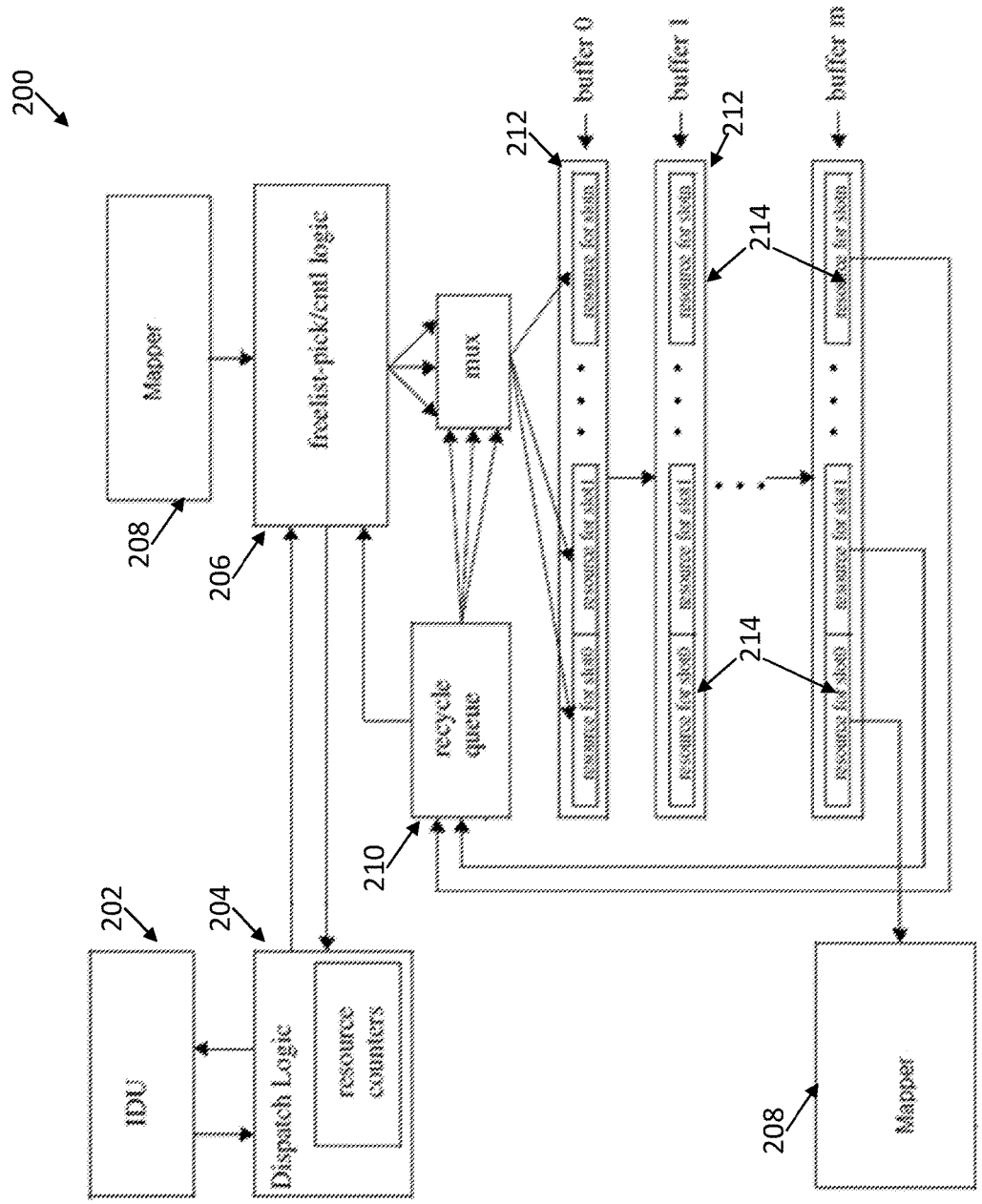
FIG. 2 is a block diagram illustrating a system for managing a free list of available resources in a processor in accordance with an exemplary embodiment.

Referring now to FIG. 2, a system 200 for managing a free list of available resources in a processor is shown. As illustrated the system 200 includes an instruction dispatch unit (IDU) 202 which is configured to dispatch instructions to dispatch logic 204. The dispatch logic 204 is configured to track what resources are available and indicate to the IDU 202 whether sufficient resources are available to dispatch an instruction. The system 200 also includes a free list logic 206 which is configured to track all resources which may be required by the instruction dispatched by the IDU 202. The free-list logic 206 is configured to allocate each of the free resources into a plurality of groups 212. In exemplary embodiments, the resources 214 for n instructions are grouped together into m groups 212. In exemplary embodiments, n is selected based on the number of instructions that can be simultaneously executed and m is selected to be large enough to account for the latency involved between the time an indication that a resource is available and when resource is used. In exemplary embodiments, resource counters within the dispatch logic 204 tracks the number of the buffer slots that contain a valid resource 214 for all slots involved.

As illustrated, n resources 214 are grouped together into m groups 212 that are managed as a single unit. Accordingly, every time a dispatch requests any of the n resources 214, the entire group of n resources 214 in the group 212 are dispatched from the buffer. The resources 214 that have been requested are sent to the mapper 208 to be used for execution and the resources 214 that have not been requested are sent to a recycle queue 210. In exemplary embodiments, populating the buffer of resources first pulls available resources from the recycle queue 210 and at this point, the resource can be re-assigned to different dispatch slot. By first pulling from the recycle queue 210 rather than the full free list logic 206, much fewer latch transitions are required and therefore much less power is consumed. In exemplary embodiments, the recycle queue 210 can be defined to be any size from the size of a group n to a larger size. In exemplary embodiments, the recycle queue 210 is defined to have a size equal to twice the size of a group, i.e., 2n. In the event a dispatch will overflow the recycle queue 210, these extra resources can then be sent back to the full free list logic 206.

FIG. 2 illustrates a system 200 with a single dispatch group (of n instructions) per cycle. However, a person of ordinary skill in the art will appreciate that the system may be configured to dispatch more than one group 212 in a cycle. Such a system would include an additional multiplexer and buffer group 212 to handle the additional dispatch group. In addition, the recycle queue 210 could be designed to be a single one or one per dispatch group.

In exemplary embodiments, the system 200 is configured to only dispatch a single group 212 per cycle as well as receive a single usage group per cycle. For example, once buffer 0 is full, it is indicated that a group 212 is ready to be dispatched and once a resource is returned to the mapper from dispatch that the group has been used, it is at buffer m. At this point, the free-list will then either consider the resource used or send back to the recycle queue. Accordingly, buffer group 1 to m−1 are configured to cover latencies between telling dispatch we are ready and dispatch responding that resources are being used.

Figure 3A:
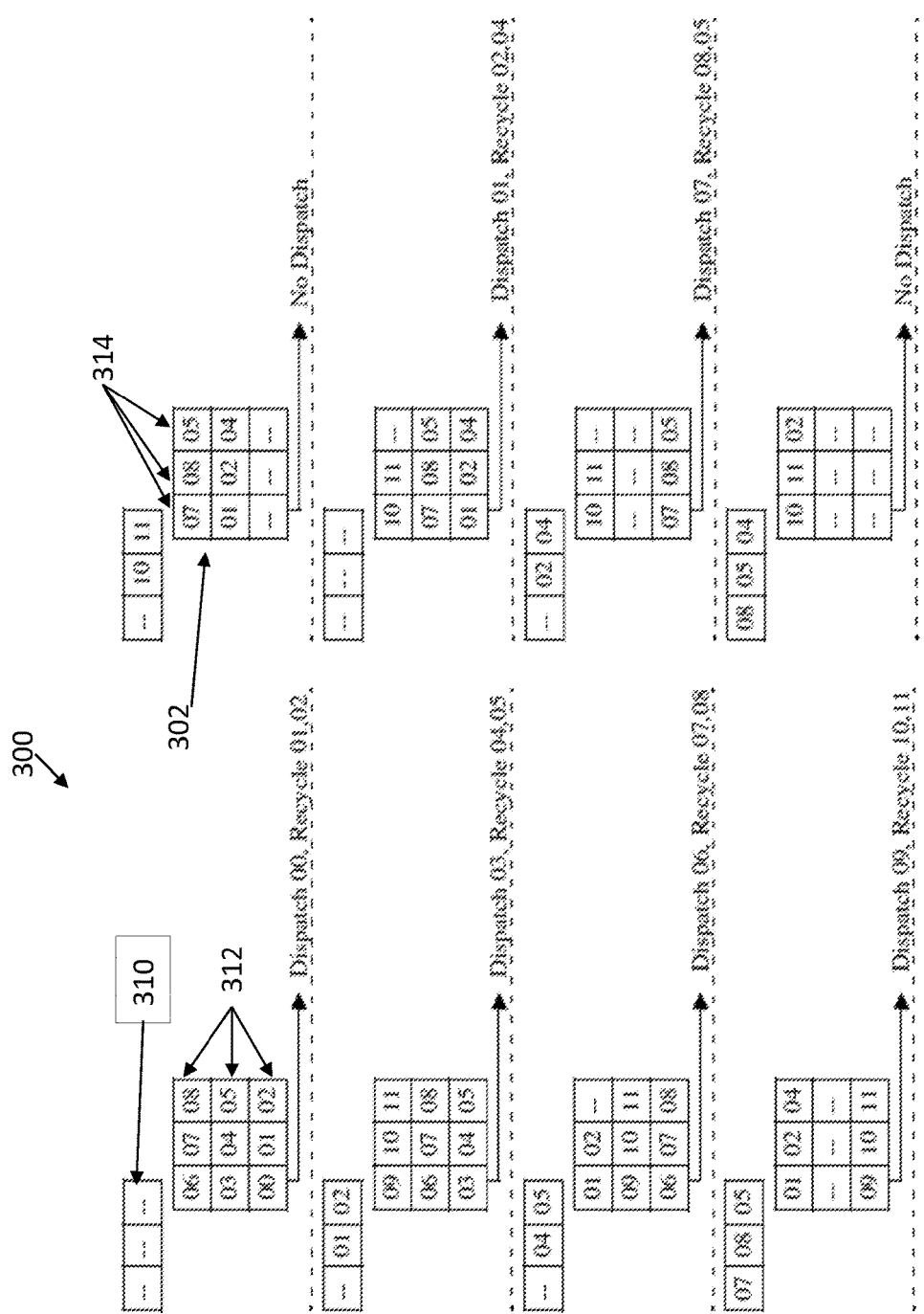
FIGS. 3A, 3B and 3C are block diagrams of a buffer system for managing a free list of available resources in a processor in accordance with an exemplary embodiment.
Figure 3B:
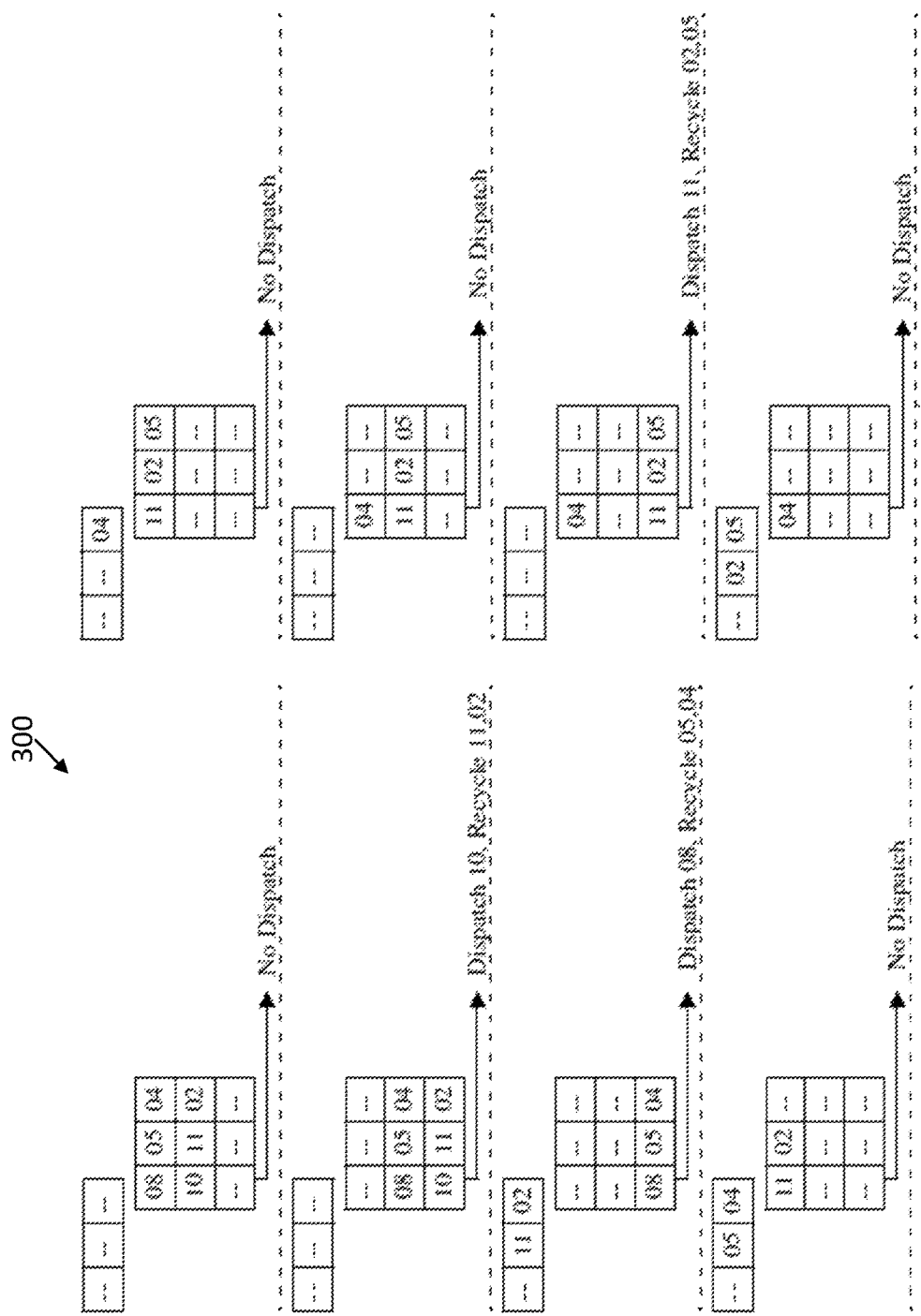
Figure 3C:
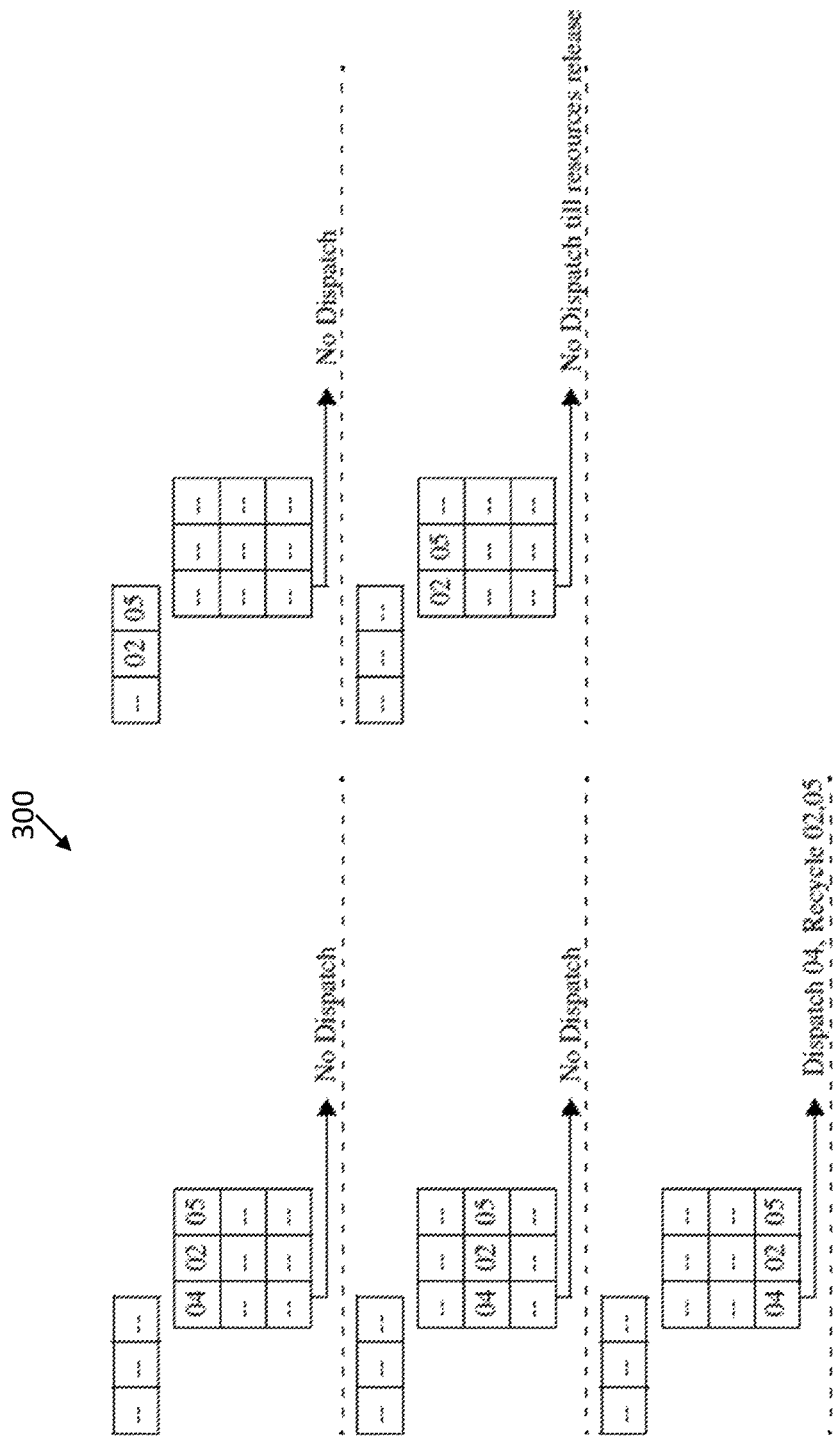

Referring now to FIGS. 3A, 3b and 3C, block diagrams of a buffer system 300 for managing a free list of available resources in a processor are shown. As illustrated, the buffer 302 includes three slots 314 that are each assigned to an execution thread of the processor. In addition, the buffer 302 includes three groups 312 that each includes one slot 314. The buffer system 300 also includes a recycle queue 310 that is used to store resources that are included in a group 312 that has been dispatched, but were not requested for execution. In exemplary embodiments, the recycle queue 310 is configured to be large enough to store enough resources to fill an entire group 312.

As shown, in an initial condition, each of the slots 314 of each group 312 of the buffer 302 is full and the recycle queue 310 is empty. After a request for a resource for a first slot 314 is requested, the first group 312 is dispatched from the buffer 302 and resource 00 is sent for execution and non-requested resources 01 and 02 are sent to the recycle queue 310. During the same cycle that the first group 312 is dispatched, a new group of resources (09, 10, 11) are brought into the buffer 302 from the free list. Next, a request for a resource for a first slot 314 is requested, the first group 312 is dispatched from the buffer 302 and resource 03 is sent for execution and non-requested resources 04 and 05 are sent to the recycle queue 310. During the same cycle that the first group 312 is dispatched, resources 01 and 02 are brought into the buffer 302 from the recycle queue 310. At this time, if the free list included an additional free resource, it would also be brought into the buffer 302. As shown, resources 01 and 02 may be assigned to different slots 314 after being brought back into the buffer 302 from the recycle queue 310. As illustrated by FIGS. 3A-3C the buffer system for managing a free list of available resources in a processor is configured to get the maximum usage of the registers when the dispatch pattern is only using 1 per cycle.

Figure 4:
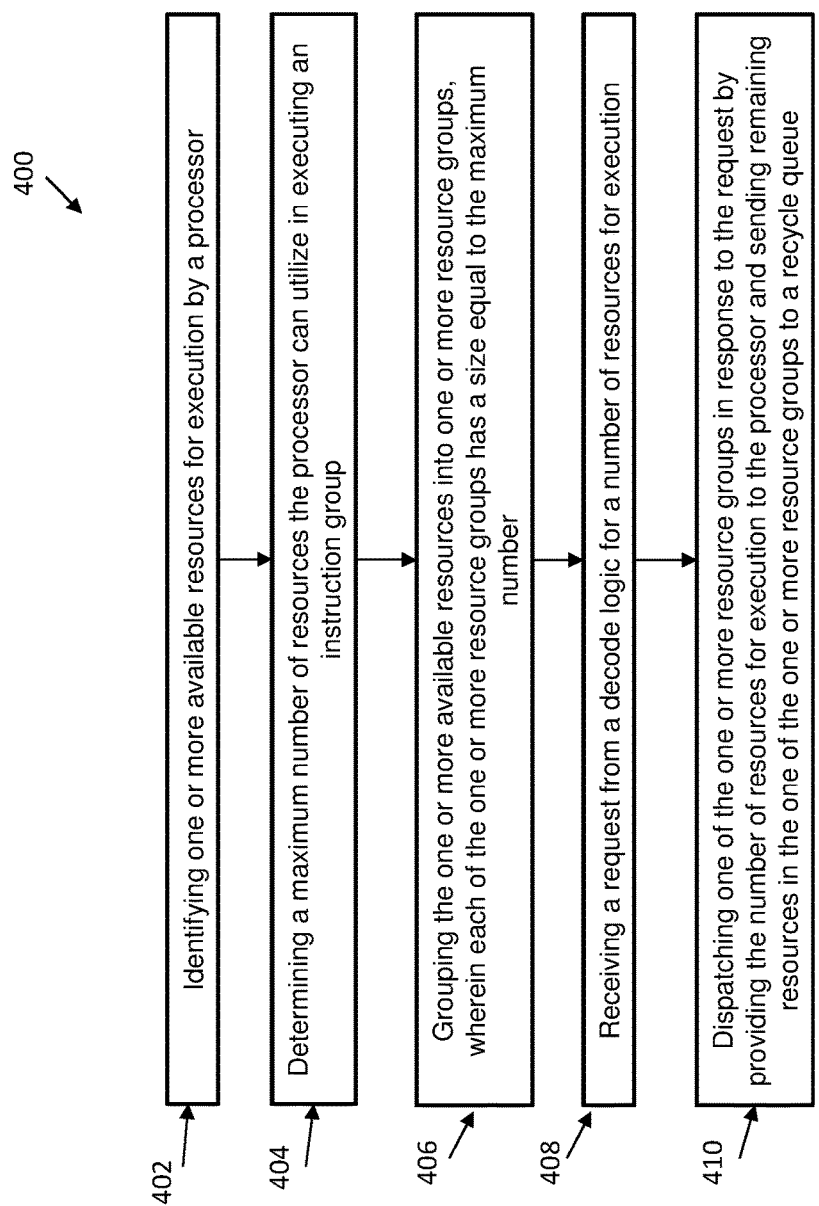
FIG. 4 is a flow diagram of a method for managing a free list of available resources in a processor in accordance with an exemplary embodiment.

Referring now to FIG. 4, a flow diagram of a method 400 for managing a free list of available resources in a processor in accordance with an exemplary embodiment is shown. As shown at block 402, the method 400 includes identifying one or more available resources for execution by a processor. Next, the method 400 includes determining a maximum number of resources the processor can utilize in executing an instruction group, as shown at block 404. As shown at block 406, the method 400 also includes grouping the one or more available resources into one or more resource groups. In exemplary embodiment, the number of groups is selected to be large enough to account for the latency between the time that an indication that a resource is available and when resource is used. The method 400 also includes receiving a request from a decode logic for a number of resources for execution, as shown at block 408. In exemplary embodiments, the number of resources may include up to the maximum number of resources. As shown at block 410, the method 400 also includes dispatching one of the one or more resource groups in response to the request by providing the number of resources for execution to the processor and sending remaining resources in the one of the one or more resource groups to a recycle queue.

In exemplary embodiments, the method may also include obtaining additional available resources from both the recycle queue and a free list logic to create a new group of available resources. In exemplary embodiments, additional available resources are first obtained from the recycle queue to fill a group of resources. If the recycle queue does not contain enough available resources to fill a group of resources, then additional available resources may be obtained from the free list logic. In exemplary embodiments, the recycle queue is configured to be large enough to store the maximum number or of resources. In one embodiment, the recycle queue 210 is defined to have a size equal to twice the size of the maximum number or of resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for managing a free list of available resources in a processor, the computer program product comprising:
    a non-transitory storage medium readable by a processing circuit and storing instructions for execution by the processing circuit for performing a method comprising:
    identifying one or more available resources for execution by the processor;
    determining a maximum number of resources the processor can utilize in executing an instruction group;
    grouping the one or more available resources into one or more resource groups, wherein each of the one or more resource groups has a size equal to the maximum number;
    receiving a request from a decode logic for a number of resources for execution;
    dispatching one of the one or more resource groups in response to the request by providing the number of resources for execution to the processor and sending one or more remaining resources in the one of the one or more resource groups to a recycle queue, wherein the one or more remaining resources are sent to the recycle queue without being utilized by the processor and wherein the recycle queue has a size equal to twice the maximum number of resources the processor can utilize in executing the instruction group;
    holding one or more instruction groups, including the instruction group, in a held resource group queue, where the size of the held resource group queue is large enough to account for a latency between indicating a resource is available and resource allocation;
    receiving a second request from the decode logic for a second number of resources for execution;
    based on determining that the recycle queue contains fewer resources than the maximum number, obtaining additional available resources from both the recycle queue and the free list to create a new group of available resources;
    indicating to a dispatch stall logic that the one or more resource groups are available for dispatch;
    incrementing a resource group count for each of the one or more resource groups indicated;
    decrementing the resource group count for each dispatching resource group; and
    stalling dispatch based on a value of the resource group count.

* * * * *